United States Patent
Qu

(10) Patent No.: US 8,573,828 B2
(45) Date of Patent: Nov. 5, 2013

(54) METHOD AND A DEVICE FOR PLASTICIZING AND TRANSPORTING POLYMER MATERIAL BASED ON ELONGATION RHEOLOGY

(75) Inventor: Jinping Qu, Guangzhou (CN)

(73) Assignee: South China University of Technology (CN)

(*) Notice: Subject to any disclaimer, the term of this patent is extended or adjusted under 35 U.S.C. 154(b) by 1007 days.

(21) Appl. No.: 12/528,702
(22) PCT Filed: Mar. 31, 2008
(86) PCT No.: PCT/CN2008/000643
§ 371 (c)(1), (2), (4) Date: Nov. 4, 2009

(87) PCT Pub. No.: WO2009/094815
PCT Pub. Date: Aug. 6, 2009

(65) Prior Publication Data
US 2010/0135102 A1 Jun. 3, 2010

(30) Foreign Application Priority Data
Jan. 25, 2008 (CN) .......................... 2008 1 0026054

(51) Int. Cl.
*B29B 7/80* (2006.01)
(52) U.S. Cl.
USPC ........................................ 366/76.93; 366/99
(58) Field of Classification Search
USPC ......... 366/76.93, 348, 349, 69, 96, 97, 98, 99
See application file for complete search history.

(56) References Cited

U.S. PATENT DOCUMENTS 1,804,604 A * 5/1931 Gilbert ............................. 418/15
2,239,165 A * 4/1941 Adams ........................... 426/565
(Continued)

FOREIGN PATENT DOCUMENTS

| CN | 2171020 Y | 7/1994 |
| CN | 101219565 A | 7/2008 |
| EP | 1731040 A2 * | 12/2006 |

OTHER PUBLICATIONS

Supplementary European Search Report of EP 08715075 dated Apr. 5, 2011, 2 pages.*

*Primary Examiner* — Tony G Soohoo
(74) *Attorney, Agent, or Firm* — Cowan, Liebowitz & Latman, P.C.; Mark Montague, Esq.

(57) ABSTRACT

A method for plasticating and conveying macromolecular materials based on elongational flow and equipment thereof are disclosed. A set of spaces having specific shape is used, and the volume of the spaces can increase and decrease periodically, and the materials flow into the spaces when the volume is increasing; and are pressed, plasticated and discharged when the volume is decreasing, so that the plasticating and conveying process is mainly under normal stress. A vane-type plasticating and conveying unit mainly comprises a cylindrical hollow stator; a columned rotor eccentrically installed in the inner cavity of the stator, wherein a group of rectangular slots are formed along the circumference of the rotor; a plurality of vanes which are arranged evenly in the slots and baffles mounted on the two sides of the stator. The inner surface of the stator, the outer surface of the rotor, the two vanes, and the two baffles surround to form the spaces having specific shape. The vane-type plasticating and conveying unit and various screw-type extruding unit or various plunger-injection unit can be combined to form a vane-type plasticating and injection device of an extruder or injection machine. The present invention is of short material thermomechanical history, low energy consumption, wide adaptability, and small volume.

11 Claims, 4 Drawing Sheets

(56) References Cited

U.S. PATENT DOCUMENTS

| | | | |
|---|---|---|---|
| RE22,160 E * | 8/1942 | Davis | 418/147 |
| 3,132,847 A * | 5/1964 | Mercuriali | 366/261 |
| 3,201,034 A * | 8/1965 | Ryffel | 418/255 |
| 3,260,210 A * | 7/1966 | Gram | 418/15 |
| 3,364,522 A | 1/1968 | Ledoux | |
| 3,831,906 A * | 8/1974 | Wakeman | 366/172.2 |
| 4,627,555 A * | 12/1986 | Locke | 222/200 |
| 4,737,090 A * | 4/1988 | Sakai et al. | 418/150 |
| 4,746,280 A * | 5/1988 | Wystemp et al. | 418/268 |
| 5,743,639 A * | 4/1998 | Puerner et al. | 366/182.1 |
| 5,743,640 A * | 4/1998 | Crossley | 366/194 |
| 2004/0125690 A1 * | 7/2004 | Sentmanat | 366/268 |

* cited by examiner

METHOD AND A DEVICE FOR PLASTICIZING AND TRANSPORTING POLYMER MATERIAL BASED ON ELONGATION RHEOLOGY

TECHNICAL FIELD

The present invention relates to a method for plasticating and conveying macromolecular materials and equipment thereof, and in particular to a method for plasticating and conveying macromolecular materials based on elongational flow and an equipment thereof.

BACKGROUND OF THE INVENTION

Macromolecular materials processing is a process with high energy consumption. Normally, screw machinery such as screw type extruder and screw type injection machine is used. The plastic materials should be proceeded with the process of conveying, melting and plasticating, during the processing of extrusion, injection or calendering, and this process occupies most of the energy consumption of the processing of macromolecular materials. In the screw machinery, the plasticating and conveying of the materials mainly depends on the dragging effect during the rotation of screw, wherein the solid conveying relies on friction, the melt conveying relies on viscosity, the velocity gradient of the materials is vertical to the direction of flow and deformation, and this flow and deformation is mainly subject to the shear stress. Therefore, it can be considered that the current screw machinery widely used is a screw type plasticating and conveying equipment of macromolecular materials based on shear rheology, and it is unavoidable that the capability of plasticating and conveying strongly depends on the internal friction of materials and the friction between the materials and the surface of material barrel. These two problems also depend on the physical property of the materials and the process conditions during manufacturing. In screw machinery, approaches such as providing grooves on the solid conveying section of the material barrel to increase the friction between the barrel and the materials, enlarging the length/diameter ratio of screw, and optimizing the screw structure are usually adopted to solve the above problems. However, these approaches may result in the increase of the thermo-mechanical history, the energy consumption, and the volume of the equipment, etc.

The dynamic processing technology shortens the thermo-mechanical history of the materials and reduces the flow resistance of the materials during the processing, so that the energy consumption of plasticating and conveying is reduced, and the plasticating capacity is improved. However, the dynamic processing equipment for macromolecular materials is essentially a screw type machine in which the plasticating and conveying of materials are based on shear rheology, and thus it can not overcome the problem that the capability of plasticating and conveying strongly depends on the friction between the materials and the inner surface of the material barrel and the internal friction of materials. Accordingly, the reduction in energy consumption of plasticating and conveying and the improvement in capability of plasticating and conveying are quite limited.

SUMMARY OF THE INVENTION

Given the shortcomings of the prior art, it is an object of the present invention to provide a method for plasticating and conveying macromolecular materials based on elongational flow, which overcomes the aforementioned problems of long thermo-mechanical history and high energy consumption during the processing.

It is also an object of the present invention to provide equipment for plasticating and conveying macromolecular materials based on elongational flow.

In the method for plasticating and conveying macromolecular materials based on elongational flow according to the present invention, a set of spaces having specific geometrical shape are formed; and the volume of the spaces increases and decreases periodically so that the materials flow into the space when the space volume increases; and the materials are pressed, plasticated and discharged when the volume decreases. Hence the materials are mainly under normal stress during the whole process of plasticating and conveying.

The equipment for achieving the above method is of the following structure: a vane-type plasticating and conveying unit comprises a cylindrical hollow stator; a columned rotor eccentrically installed in the inner cavity of the stator, wherein a group of rectangular slots are formed along the circumference of the rotor; and a plurality of vanes which are arranged evenly in the slots and can move freely along the radial direction. At each end of the stator one baffle which is concentrically to the stator is installed to control the flow direction of the materials. In the vane-type plasticating and conveying unit, the eccentricity between the stator and the rotor is adjustable and is larger than zero but smaller than the difference between the radius of the inner cavity of the stator and the radius of the rotor. The inner surface of the stator, the outer surface of the rotor, the two vanes, and the two baffles surround to form spaces having specific geometrical shape. When the rotor rotates, a pair of the vanes on the diameter of the rotor make reciprocating radial movements within the rectangular slot formed along the circumference of the rotor due to the outer top surface of the vanes being restricted by the inner surface of the stator; consequently the volume of the enclosed spaces increases and decreases periodically. When the space volume increases, the materials flow into the space gradually; whereas when the volume decreases, the materials are milled, compacted and discharged in the space mainly under the normal stress; and are plasticated and melted under the outer heating of the stator and are forced out in the end. Thus, the whole plasticating and conveying process is completed in a very short thermo-mechanical history. During the process, the volume of the spaces changes synchronously with the size of the cross section through which the materials pass, accordingly the velocity gradient of the materials is parallel to the direction of flow and deformation, which is mainly subject to normal stress. Therefore this plasticating and conveying process is based on elongational flow. A plurality of vane-type plasticating and conveying units may be combined in series to form a vane-type plasticating and conveying extruder. The vane-type plasticating and injection equipment of various types of extruder or injection machine may consist of a vane-type plasticating and conveying unit and various screw-type extruding units or plunger-type injection units.

The method for plasticating and conveying macromolecular materials based on elongational flow and the equipment thereof overcome the shortcoming that in a traditional plasticating and conveying unit, the plasticating and conveying capability strongly depends on the friction between the materials and the barrel surface and the internal friction of materials. Compared with the screw-type plasticating and conveying technology and equipment, the present invention is of the following advantages:

1. the thermo-mechanical history is significantly shortened; and energy consumption during the plasticating and conveying processing is reduced;
2. the plasticating and conveying process is accomplished through the volume change of the specific shape, which shows the character of positive displacement and is of high efficiency;
3. the process of plasticating and conveying is completed in very short thermo-mechanical history, and the equipment has a much more compact structure;
4. the capacity of plasticating and conveying is independent of the materials' physical properties; the stability of plasticating and conveying is improved; and the equipment is suitable for more materials.

DETAILED DESCRIPTION OF THE PREFERRED EMBODIMENT

Many aspects of the invention can be better understood in the following embodiments with reference to the accompanying drawings.

Embodiment 1

Figure 1:
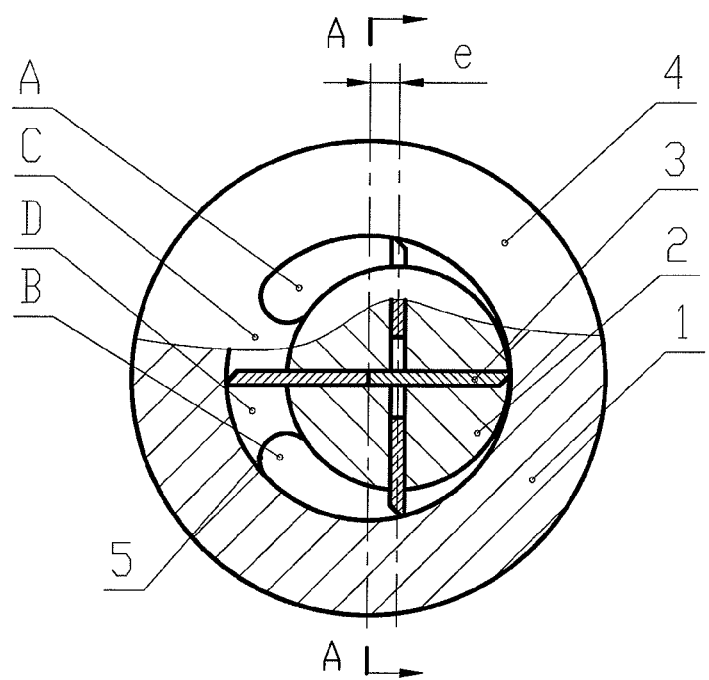
FIG. 1 is a schematic structural view of a vane type plasticating and conveying unit in which the materials flow into the unit through the feed inlet of the baffle.
Figure 2:
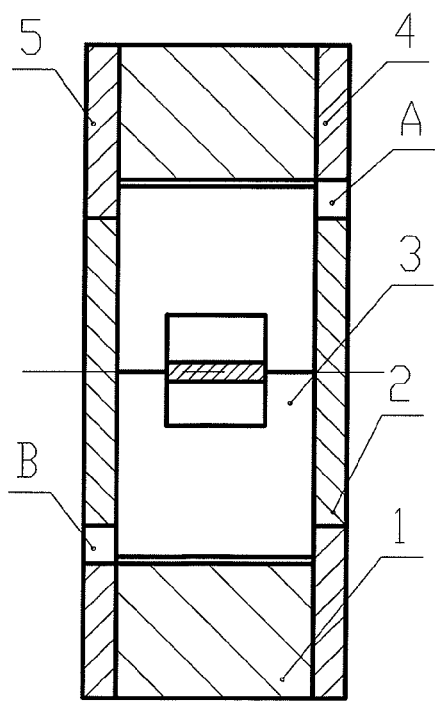
FIG. 2 is a sectional view of the vane type plasticating and conveying unit shown in FIG. 1, taking along the A-A line.

Referring to FIG. 1 and FIG. 2, the vane type plasticating and conveying unit mainly comprises a hollow stator 1 having cylindrical inner cavity; a columned rotor 2 eccentrically installed inside the inner cavity of the stator, wherein a group of rectangular slots are formed along the circumference of the rotor; a plurality of vanes 3 which are arranged evenly in the rectangular slot and can move freely along the radial direction; and baffles 4, 5 which are mounted at the both ends of the stator. The rotor 2 being eccentrically installed inside the hollow stator 1, the eccentricity between the stator 1 and the rotor 2 is adjustable, which is larger than zero but smaller than the difference between the radius of the inner cavity of the stator and the radius of the rotor. The vanes 3 are mounted in pairs inside the rectangular slot, the inner bottoms of the two vanes being contacted with each other, and the outer top surfaces being contacted with the inner surface of the stator. When the rotor 2 rotates in counterclockwise direction, a pair of vanes 3 on the diameter of the rotor 2 make reciprocating radial movements within the rectangular slot due to the outer top surface of the vanes being restricted by the inner surface of the stator; consequently the volume of the enclosed spaces defined by the inner surface of the stator 1, the outer surface of the rotor 2, the vanes 3 and the baffles 4, 5 increases and decreases periodically. The volume increases when the Vane 3 gradually moves out of the section C of the rotor 2; while the volume decreases when the vane 3 gradually moves into the section D of the rotor 2. When the volume is increasing, the macromolecular materials flow in through the feed inlet A of the baffle 4; and when the volume is decreasing, the materials are milled, compacted, discharged and plasticated mainly under the normal stress; and meanwhile the materials are melted under the outer heating of the stator and are forced out through the outlet B of the baffle 5.

Figure 3:
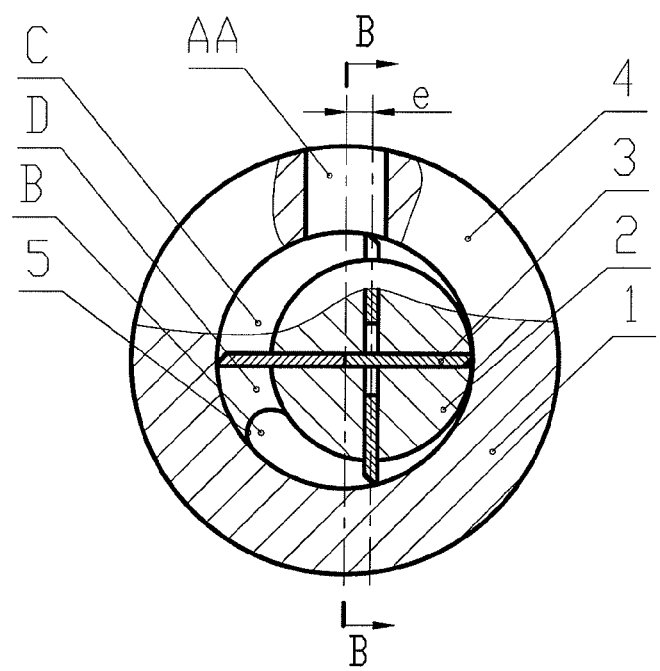
FIG. 3 is a schematic structural view of a vane type plasticating and conveying unit in which the materials flow into the unit the feed inlet of the stator.
Figure 4:
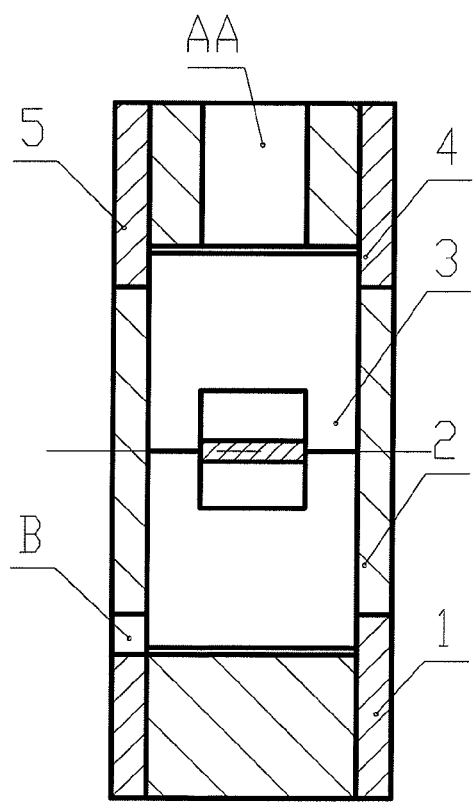
FIG. 4 is a sectional view of the vane type plasticating and conveying unit shown in FIG. 3, taking along the B-B line.

Referring to FIG. 3 and FIG. 4, when the volume is increasing, the materials flow in through the feed inlet AA of the stator 1; and when the volume is decreasing, the materials are milled, compacted, discharged and plasticated mainly under the tensile (compressive) stress; and meanwhile the materials are melted under the outer heating of the stator, and are forced out through the outlet B of the baffle 5.

Embodiment 2

Figure 5:
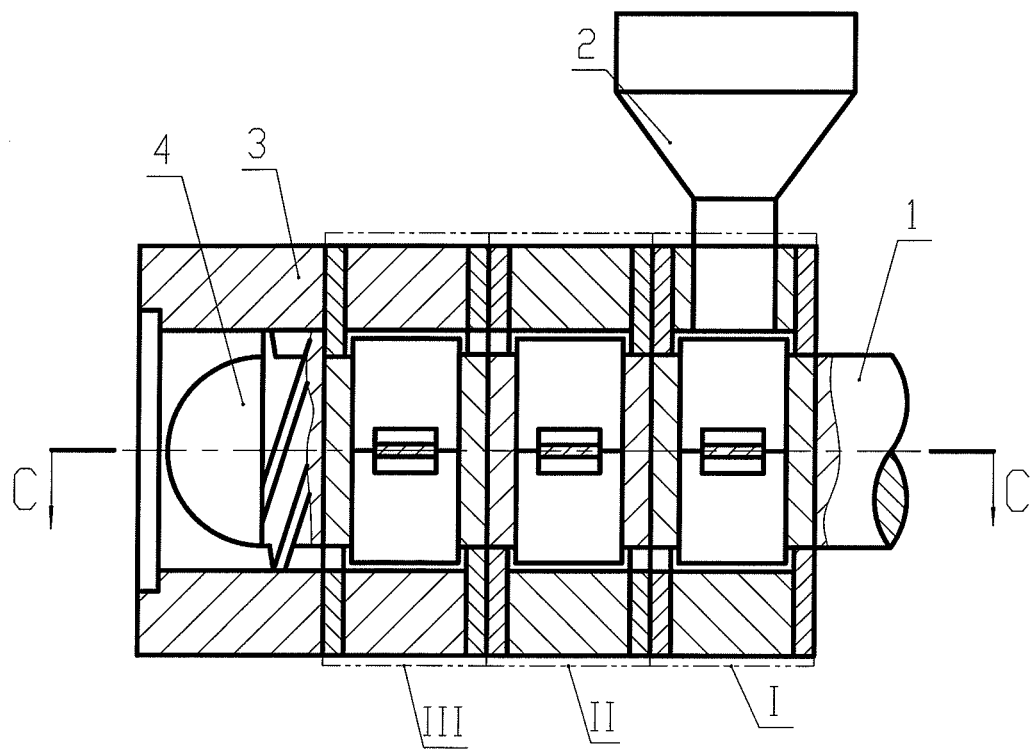
FIG. 5 is a schematic structural view of a vane type plasticating extruder.
Figure 6:
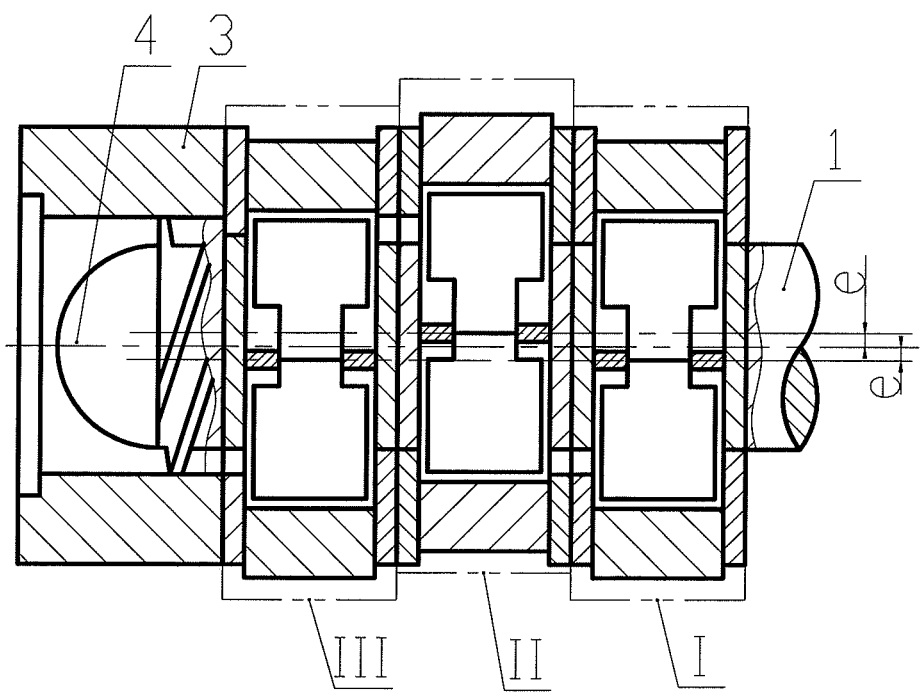
FIG. 6 is a sectional view of the extruder shown in FIG. 5, taking along the C-C line.

Referring to FIG. 5 and FIG. 6, the vane-type of plasticating extruder mainly comprises vane-type plasticating and conveying units I, II, III and a driving shaft 1, a material hopper 2, a transition sleeve 3 and a flow divider 4, wherein the vane-type plasticating and conveying units I, II, III are superposed in series; the baffle 5 of the vane-type plasticating and conveying unit I and the baffle 4 of the unit II are connected concentrically to each other; the baffle 5 of the unit II and the baffle 4 of the unit III are also connected concentrically to each other; and the transition sleeve 3 is coaxially connected to the baffle 5 of the unit III. The eccentric direction of the stator 1 of the unit I with respect to the rotor 2 is opposite to the eccentric direction of the stator 1 of the unit II with respect to the rotor 2; and the eccentric direction of the stator 1 of the unit III with respect to the rotor 2 is opposite to the eccentric direction of the stator 1 of the unit II with respect to the rotor 2. The rotors 2 of the vane-type plasticating and conveying units are coaxially connected with each other; and the driving shaft 1 is connected coaxially to the rotor 2 of the unit I. The flow divider 4 is disposed in the cylindrical inner cavity of the transition sleeve 3, and is connected coaxially to the rotor 2 of the unit III. The material hopper 2 is mounted on the stator 1 of the unit I. The outlet B on the baffle 5 of the unit I is communicated with the feed inlet A on the baffle 4 of the unit II; and the outlet B on the baffle 5 of the unit II is communicated with the feed inlet A on the baffle 4 of the unit III. When the rotors 2 of the vane-type plasticating and conveying units I, II, III are driven by the driving shaft 1, the materials from the material hopper 2 flow into the unit I; and after being plasticated, materials are conveyed into the units II, III in sequence for further plasticating and uniformization; and final products are obtained after the extruding, cooling and formation in the mould connected to the transition sleeve 3.

Embodiment 3

Figure 7:
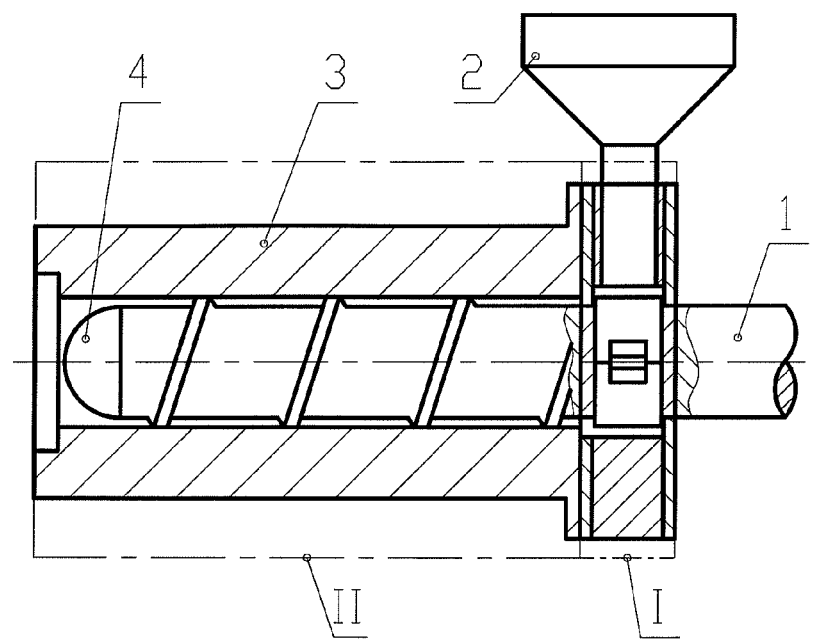
FIG. 7 is a schematic structural view of an extruder combined with vane-type plasticating and conveying unit and screw.

Referring to FIG. 7, the screw-type plasticating extruder mainly comprises a vane-type plasticating and conveying unit I, a screw-type extruding unit II, a driving shaft 1 and a material hopper 2, wherein the extruding unit II consists of a material barrel 3 and a screw 4. The plasticating and conveying unit I is connected to the extruding unit II in series, wherein the material barrel 3 of the extruding unit II is coaxially connected to the baffle 5 of the plasticating and conveying unit I; the screw 4 of the extruding unit II is coaxially connected to the rotor 2 of the plasticating and conveying unit I; and the driving shaft 1 is coaxially connected to the rotor 2 of the v unit I. The material hopper 2 is mounted on the stator 1 of the plasticating and conveying unit I. When the rotor 2 of the plasticating and conveying unit I and the screw 4 of the extruding unit II are rotated by the driving shaft 1, the materials from the material hopper 2 flow into the plasticating and conveying unit I; and after being plasticated, the materials are conveyed into the extruding unit II for further plasticating and uniformization; and final products are obtained after the extruding, cooling and formation in the mould connected on the material barrel 3.

Embodiment 4

Figure 8:
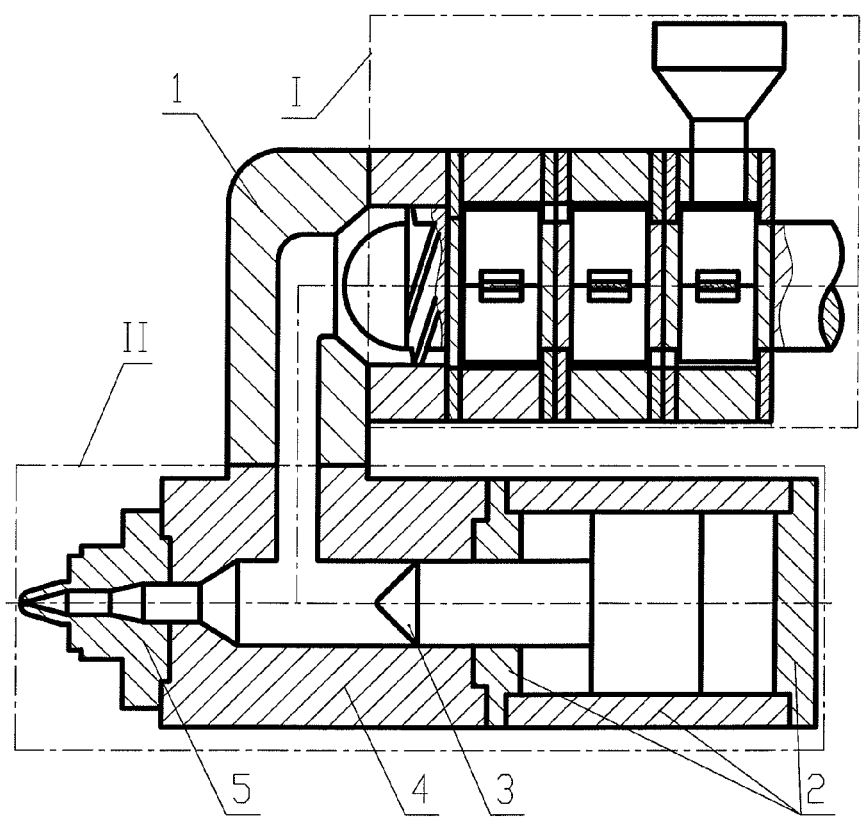
FIG. 8 is a schematic structural view of a vane type plasticating and injection machine.

Referring to FIG. 8, the vane-type plasticating and injection equipment mainly comprises a vane-type plasticating extruder I, a plunger-type injection unit II and a material retainer 1, wherein the injection unit II consists of an injection cylinder 2, an injection piston 3, an injection material barrel 4 and a nozzle 5. The inlet end of the material retainer 1 is connected to the outlet end of the transition sleeve 3 of the plasticating extruder I; and the outlet end of the material retainer 1 is connected to the inlet end of the injection barrel 4 of the injection unit II. The melt obtained after plasticating in the vane type plasticating extruder I enters into the injection material barrel 4 of the injection unit II; and the injection piston 3 of the injection unit II moves backwards under the pressure of the melt. When the storage amount of the injection material barrel 4 of the injection unit II reaches the measuring value required by the injection product, the plasticating extruder I stops plasticating, and the measuring process of plasticating of the injection machine is finished. After the mould filling and the pressure maintaining process of the injection machine is finished, the vane-type plasticating extruder I starts plasticating during the product cooling stage; and the injection machine starts a new cycle of product molding.

It should be emphasized that the above-described embodiments of the present invention, particularly, any preferred embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method for plasticating and conveying macromolecular materials based on elongational flow, the method comprising:
   increasing and decreasing the volume of a space periodically;
   receiving the flow of the macromolecular materials into the space having a specific shape, when the volume of the space is increasing; and
   pressing, plasticating and then forcing out the macromolecular materials, when the volume is decreasing, the plasticating and conveying process being mainly under normal stress.

2. The method of claim 1, wherein the plasticating and conveying process is performed using one or more vane-type plasticating and conveying units, each plasticating and conveying unit mainly comprises a cylindrical hollow stator (1), a columned rotor (2) eccentrically installed in the inner cavity of the stator (1), wherein a group of rectangular slots are formed along the circumference of the rotor; a plurality of vanes (3) which are arranged evenly in the slots and can move freely along the radial direction and baffles (4, 5) respectively mounted at the both ends of the stator (1),
   wherein the spaces provided are increased and decreased periodically such that materials are compacted, plasticated and then forced out when the volume is decreasing in a manner whereby the plasticating and conveying process is mainly under normal stress.

3. The method of claim 2, wherein the eccentricity between the stator (1) and the rotor (2) is adjustable, and is larger than zero but smaller than the difference between the radius of the inner cavity of the stator (1) and the radius of the rotor (2).

4. The method of claim 2, wherein the vanes (3) are provided in pairs and at least two pairs on the diameter of the rotor (2), the total height of each pair of the vanes (3) is smaller than the diameter of the cylindrical inner cavity of the stator (1), the inner bottoms of two vanes (3) are contacted with each other, and when the rotor (2) rotates, the two vanes (3) on the diameter of the rotor (2) make reciprocating radial movements within the rectangular slot due to the outer top surface of the vanes being restricted by the inner surface of the stator (1).

5. The method of claim 2, wherein when the rotor (2) rotates, the volume of the spaces defined by the inner surface of the stator (1), the outer surface of the rotor (2), the vanes (3) and the baffles (4, 5) increases and decreases periodically.

6. The method of claim 2, wherein the baffles (4, 5) on two sides of the stator (1) are provided with a material inlet (A) and a material outlet (B) respectively, the material inlet (A) is corresponding to the section (C) where the vane (3) gradually moves out of the rotor (2), and the material outlet (B) is corresponding to a section (D) where the vane (3) gradually moves into the rotor (2).

7. The method of claim 2, wherein a material outlet (B) is provided on the baffle (5) on one side of the stator (1), a material inlet (AA) is provided on the stator (1), and the material inlet (AA) is corresponding to the section (C) where the vane (3) gradually moves out of the rotor (2).

8. The method of claim 2, wherein a plurality of vane-type plasticating and conveying units are combined in series along the rotation axis of the rotor (2) to form an extruder.

9. The method of claim 2, wherein screw-type extruding units are combined with the vane-type plasticating and conveying units for further plasticating and uniformization of the material conveyed from the vane-type plasticating and conveying units into the screw-type extruding units so that a screw of screw-type extruding units is coaxially connected to the rotor of the vane-type plasticating and conveying units.

10. An apparatus for plasticating and conveying macromolecular materials based on elongational flow, the apparatus comprising:
   one or more vane-type plasticating and conveying units, comprising,
      a cylindrical hollow stator,
      a columned rotor, eccentrically installed in the inner cavity of said stator, wherein a group of rectangular slots are formed along the circumference of the rotor;
      a plurality of vanes arranged evenly in the slots such that said vanes may move freely in a substantially radial direction, and
      baffles mounted at the both respective ends of the stator,
      wherein the volume of the spaces provided in the stator may be increased and decreased by substantially radial movement of said plurality of vanes, such that said macromolecular materials flow into the spaces when the volume increases and thereafter are compacted and then plasticated and conveyed, under substantially normal stress, out of the conveying unit as the volume of the spaces decreases.

11. An apparatus for plasticating and conveying macromolecular materials based on elongational flow, the apparatus comprising:

At least one vane-type plasticating and conveying unit, comprising,
   a cylindrical hollow stator,
   a columned rotor, eccentrically installed in the inner cavity of said stator,
   wherein a group of rectangular slots are formed along the circumference of the rotor;
a plurality of vanes arranged evenly in the slots such that said vanes may move freely in a substantially radial direction, and
   baffles mounted at the both respective ends of the stator,
wherein the volume of the spaces provided in the stator may be increased and decreased by substantially radial movement of said plurality of vanes, such that said macromolecular materials flow into said spaces when the volume increases and thereafter are compacted and then plasticated and conveyed, under substantially normal stress, out of the conveying unit as the volume of the spaces decreases; and
at least one screw-type extruding unit coaxially connected to the rotor of the at least one vane-type plasticating and conveying unit for further plasticating and uniformization of the material conveyed from the at least one vane-type plasticating and conveying unit.

* * * * *